C. VAN NATTA.
CHECK ROW WIRE.
APPLICATION FILED SEPT. 21, 1909.
989,452.
Patented Apr. 11, 1911.
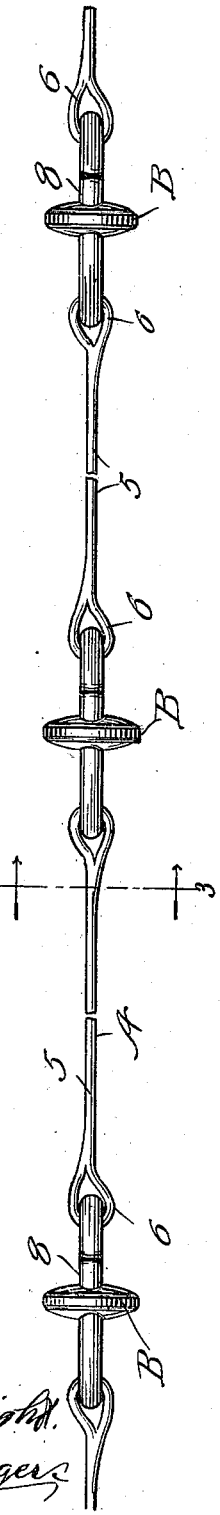
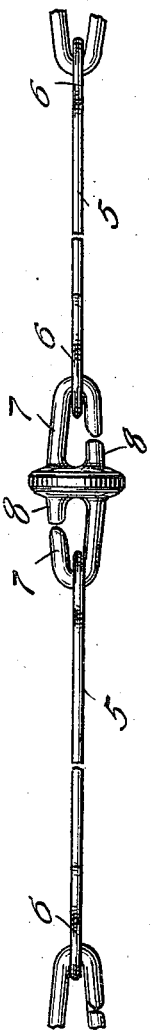
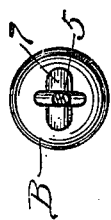
Witnesses
J. L. Wright
Wm. Bagger
Inventor
Clarence VanNatta
By Victor J. Evans,
Attorney.

UNITED STATES PATENT OFFICE.

CLARENCE VAN NATTA, OF POTOSI, WISCONSIN.

CHECK-ROW WIRE.

989,452.  Specification of Letters Patent. Patented Apr. 11, 1911.

Application filed September 21, 1909. Serial No. 518,737.

*To all whom it may concern:*

Be it known that I, CLARENCE VAN NATTA, a citizen of the United States, residing at Potosi, in the county of Grant and State of Wisconsin, have invented new and useful Improvements in Check-Row Wires, of which the following is a specification.

This invention relates to check row chains such as are used in connection with check row corn planters for the purpose of actuating the seed dropping mechanism at proper intervals by means of obstructing members such as buttons that are connected with and suitably spaced upon the chain and which constitute links of said chain at suitable intervals.

The invention has for its object to provide a chain of this class which shall be exceptionally strong and durable; which will be simple in construction and inexpensive; and which shall be so constructed as to prevent rupture or disconnection of the parts from taking place under ordinary circumstances.

With these and other ends in view which will readily appear as the nature of the invention is better understood, the same consists in the improved construction, and novel arrangement and combination of parts which will be hereinafter fully described, and particularly pointed out in the claim.

In the accompanying drawings has been illustrated a simple and preferred form of the invention; it being, however, understood that no limitation is necessarily made of the precise structural details therein exhibited but that changes, alterations and modifications within the scope of the invention may be resorted to when desired.

In the drawings:—Figure 1 is a top plan view of a check row chain constructed in accordance with the invention. Fig. 2 is a side elevation of the same. Fig. 3 is a transverse sectional view taken on the plane indicated by the line 3—3 in Fig. 1.

The chain is composed of links A of suitable length, said links alternating with the buttons or obstructing members B.

Each of the links A is composed of a straight wire shank 5 of suitable length having terminal loops or eyes 6—6 which are formed by bending the ends of the wire shank upon itself, each terminal end being securely connected with the body 5 by electrically welding the parts together. By thus constructing the links A the shank 5 of each link may be made of equal thickness throughout intermediate the terminal eyes 6—6 and the latter will likewise be of a cross sectional area equal throughout and equal to that of the shank; a result which could not be well attained if the terminal ends were connected with the bodies of the links in any manner other than the one herein described, to wit: by electrically welding. By this construction several important advantages are obtained one of which is that the links are made of greater strength and of equal strength throughout; another advantage is that the shanks will be of equal thickness of cross sectional area throughout thus avoiding obstructions upon the shanks intermediate the terminal eyes.

The obstructing member or button B is provided upon opposite sides thereof with hooks 7 and with lugs or studs 8, the latter projecting in the direction of the points of the hooks. These members are made preferably of malleable castings, enabling the terminal eyes 6 of the links to be placed in engagement with the hooks after which the latter may be manipulated, by hammering or pressing while in a cold condition, to cause the hooks to become obstructed by the lugs 8 sufficiently to prevent accidental disengagement of the link eyes 6.

Having thus described the invention, what is claimed, is:—

A check row chain comprising a plurality of links formed of wire, each of said links having an elongated shank portion and eyes at the ends thereof formed by bending and welding, said eyes being throughout of a cross sectional area equal to that of the shank with which they are integrally connected, and obstructing members intermediate said links, said obstructing members consisting of buttons of malleable metal provided on opposite sides thereof with hooks 7 and with lugs 8, the latter projecting in the direction of the points of the hooks, the hooks of each obstructing member being in engagement with terminal eyes of two links.

In testimony whereof I affix my signature in presence of two witnesses.

CLARENCE VAN NATTA.

Witnesses:
 FLORENCE DIXON,
 S. J. FLYNN.

Copies of this patent may be obtained for five cents each, by addressing the "Commissioner of Patents, Washington, D. C."